United States Patent [19]

Beckey

[11] Patent Number: 4,836,442
[45] Date of Patent: Jun. 6, 1989

[54] COMPENSATION CIRCUIT FOR SENSOR LAG TO REDUCE UNDERSHOOT AND OVERSHOOT

[75] Inventor: Thomas J. Beckey, Edina, Minn.
[73] Assignee: Honeywell Inc., Minneapolis, Minn.
[21] Appl. No.: 284,279
[22] Filed: Dec. 14, 1988
[51] Int. Cl.$^4$ .............................................. G01K 7/00
[52] U.S. Cl. .................. 236/46 R; 364/557; 374/169
[58] Field of Search ........... 364/557; 236/46 R, 78 D, 236/68 B; 165/12; 374/169

[56] References Cited

U.S. PATENT DOCUMENTS

| | | | |
|---|---|---|---|
| 4,092,863 | 6/1978 | Turner | 374/169 |
| 4,254,906 | 3/1981 | Hayes | 236/68 B |
| 4,489,882 | 12/1984 | Rodgers | 236/78 D |
| 4,557,317 | 12/1985 | Harmon, Jr. | 236/46 R |
| 4,615,380 | 10/1986 | Beckey | 236/46 R |
| 4,671,457 | 6/1987 | Berkhof | 236/46 R |

*Primary Examiner*—William E. Wayner
*Attorney, Agent, or Firm*—Mitchell J. Halista; Clyde C. Blinn; Albin Medved

[57] ABSTRACT

A compensation circuit for sensor lag uses a sensor temperature signal modification circuit to provide a modified sensor temperature signal for subsequent use in controlling the sensed temperature. The compensation circuit digitally compares a current sensor temperature representative signal and a sensor temperature signal at a last or preceeding sample time to produce a difference signal which is converted to a sensor slope signal and is multiplied by a sensor time constant. The resulting signal is passed through a filter to eliminate transient effects and is summed with the original sensor temperature signal to provide a sensed temperature signal for control of the temperature whereby the sensed temperature is a better estimate of the actual environmental temperature controlled by a thermostat utilizing the sensed temperature signal.

4 Claims, 1 Drawing Sheet

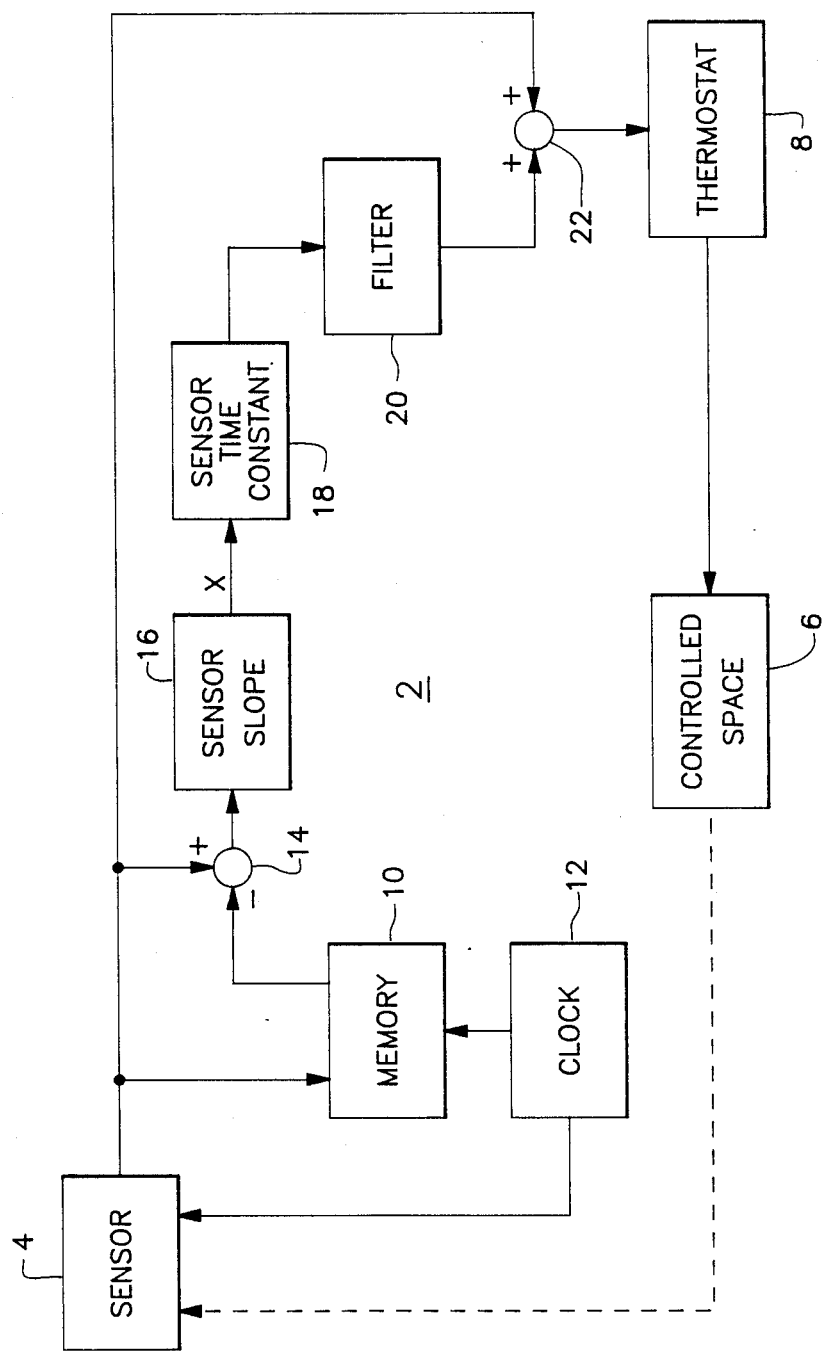

COMPENSATION CIRCUIT FOR SENSOR LAG TO REDUCE UNDERSHOOT AND OVERSHOOT

BACKGROUND OF THE INVENTION

1. Field of the Invention

The present invention relates to environmental condition controls. More specifically, the present invention is directed to apparatus for compensating sensor lag in an environmental condition sensor to reduce undershoot and overshoot in an environmental condition control system.

2. Description of the Prior Art

During recovery from an offset environmental condition, e.g., a sensed environmental temperature is different from a desired or setpoint temperature, the temperature of the space being controlled conventionally overshoots the setpoint temperature significantly more than the temperature response of the temperature sensor utilized by a temperature control thermostat. The overshoot effect is a result of the sensor time constant or lag. The amount of deviation between the space temperature and the sensor temperature during a recovery or modification of the temperature to achieve the setpoint level is approximately equal to the sensor slope, i.e., (temperature change)×(the time constant of the sensor). For example, if the temperature change or ramp rate of the thermostat setpoint is 5° F./hr. then the deviation would be five ×0.25 hr or 1.25F. Accordingly, if the sensor reading is 71° F. then the actual environmental would be 71+1.25 or 72.25. With a ramp rate of the thermostat of 10° F./hr, the deviation would be 2.5° F. The end result is that to ensure that there will be a minimum amount of overshoot requires that the ramp rate of the thermostat must be limited to approximately 5° F./hr. Accordingly, it would be desirable to provide a compensation circuit for compensating for the deviation of the sensor temperature from the space temperature during a temperature recovery by the thermostat.

SUMMARY OF THE INVENTION

In accomplishing this and other objects, there has been provided, in accordance with the present invention, a compensation circuit for a sensor lag of a sensor responsive to an environmental condition utilizing a comparison between the current sensor output and the last sensor output with a resulting digital output being converted to a sensor slope and multiplied by a sensor time constant. The result is passed through a filter and is added to the current sensor output to provide a sensed environmental condition signal for use in controlling the environmental condition.

BRIEF DESCRIPTION OF THE DRAWING

A better understanding of the present invention may be had when the following detailed description is read in connection with the accompanying drawing, in which the single figure is a block diagram of a compensation circuit embodying the present invention.

DESCRIPTION OF THE PREFERRED EMBODIMENT

Referring to the single figure drawing in more detail, there is shown a compensation circuit 2 for a sensor 4 used for sensing a condition, e.g., temperature, of a controlled space or environment 6. The temperature of the controlled space 6 is controlled by means of a thermostat 8 which is provided with an output from the compensation circuit 2 to effect such a control. The sensor 4 includes an analog-to-digital (A/D) converter to convert the sensor output which may be in the form of a variable resistance to a digital number that corresponds to the sensed temperature of the controlled space 6. The sensor 4 may be incorporated in the thermostat 8 as part of a common housing. The value of the sensed temperature at the time that the last conversion by the sensor 4 was made is stored in a memory 10. The memory 10 and the analog-to-digital conversion operation by the sensor 4 are controlled by a clock 12. The memory 10 and the clock 12 may be part of a microprocessor also incorporated in a common housing with the thermostat 8. A typical time step for the A/D conversion operation may be one minute.

The output from the memory is periodically applied to a first summing node 14 as a digital word representative of the sensor temperature at the last time step whereby the difference between the current sensed temperature from the sensor 4 and the previous sensed temperature is summed at the node 14 and the node output applied to a sensor slope derivation 16. The sensor slope is determined by dividing the node output, i.e., the temperature difference, by the time step to give a slope, e.g., °F./hr. The sensor slope 16 may be also part of the aforesaid microprocessor whereby a stored program may be used to effect the sensor slope computation. The sensor slope is subsequently multiplied by a sensor time constant 18 which is a stored value obtained by a prior performance testing of the sensor, e.g., 15 minutes. Subsequently, the output of the sensor time constant 18 is applied through a filter 20 having as fixed time constant, e.g., a digital equivalent of an electronic filter whereby the aforesaid microprocessor computes the output of the filter 20 according to the relationship of output=new value−old value×(1-e$^{-}$ time step/time constant)$_+$ old value. This enables the compensation circuit to neglect transients in the signal.

Finally, the output of the filter 20 is combined with the current sensor temperature signal at a second summing node 22 and the resulting output is applied to the thermostat 8 as a control signal for the thermostat 8 in controlling the temperature of the controlled space 6. The aforesaid filter equation is solved at each time step to provide an output signal for the thermostat 8 at each time step. During normal operation, the sensed temperature stays fairly constant so the slope is substantially zero whereby no compensation is needed since sensed temperature equals actual temperature. During an extended ramping period wherein the thermostat is attempting to bring the temperature of the controlled space to match a setpoint temperature, the sensed temperature would lag the actual temperature in an amount proportional to the thermal time constant of the sensor.

The compensation circuit of the present invention provides a means for compensating for the deviation of the sensed temperature from the controlled space desired temperature during the recovery by the thermostat 8. In effect, the sensor temperature is made equal to the desired temperature. As a result, it is possible to go to a higher ramp rate for the thermostat and obtain greater energy savings while still minimizing overshoot or undershoot. Thus, the compensation circuit provides automatic compensation during extended ramping such as a recovery after night's setback of the thermostat. It should be noted that the compensation of the present invention is equally effective for cooling mode of operation as well as heating.

Accordingly, it may be seen that there has been presented, in accordance with the present invention, a compensation circuit for minimizing overshoot and undershoot of an environmental condition control system.

The embodiments of the present invention in which an exclusive property or privilege is claimed are defined as follows:

1. A compensation circuit for a sensor lag of a sensor responsive to an environmental condition comprising
    means for storing a prior output of a sensor,
    means for comparing a present sensor output with the stored prior output to produce a difference output,
    means for converting the difference output to a sensor slope,
    means for multiplying the sensor slope by a predetermined sensor time constant,
    filter means having a fixed time constant for filtering an output from said means for multiplying and
    summing means for adding an output from said filter means to the present sensor output to produce a control signal for controlling the environmental condition.

2. A circuit as set forth in claim 1 wherein said means for storing includes a memory and a clock for timing the operation of said memory.

3. A circuit as set forth in claim 1 wherein said condition is temperature.

4. A circuit as set forth in claim 1 wherein said filter means includes a microprocessor programmed to produce an output according to:

$$\text{output} = (\text{new value} - \text{old value})(1 - e^{-\text{ time step/time constant}}) + \text{old value}.$$

* * * * *